United States Patent [19]
Upchurch et al.

[11] Patent Number: 5,539,637
[45] Date of Patent: Jul. 23, 1996

[54] BIOLOGICALLY-IDENTIFIED OPTIMAL TEMPERATURE INTERACTIVE CONSOLE (BIOTIC) FOR MANAGING IRRIGATION

[75] Inventors: Dan R. Upchurch; Donald F. Wanjura; John J. Burke; James R. Mahan, all of Lubbock, Tex.

[73] Assignee: The United States of America as represented by the Secretary of Agriculture, Washington, D.C.

[21] Appl. No.: 261,510

[22] Filed: Jun. 17, 1994

[51] Int. Cl.⁶ .............................. G06F 169/800
[52] U.S. Cl. .............................. 364/420; 364/557
[58] Field of Search .............................. 364/420, 152, 364/153, 154, 143, 156, 557, 145, 146, 141; 47/17, 48.5, 27; 137/79, 78.2, 78.3

[56] References Cited

PUBLICATIONS

Wanjura, D. F., et al., "Evaluating Temperature–Time Thresholds for Scheduling Irrigation", 1993 International Summer Meeting sponsored by the American Society of Agricultural Engineers and The Canadian Society of Agricultural Engineering, Spokane, Washington, Jun. 20–23, 1993, Paper No. 932052.

Upchurch, D. R., et al., "Automating Trickle–Irrigation Using Continuous Canopy Temperature Measurements", *Acta Horticulturae 278*, 1990, pp. 299–308.

Wanjura, D. F., et al., "Automated Irrigation Based on Threshold Canopy Temperature", *Transactions of the ASAE–American Society of Agricultural Engineers*, Jan.–Feb. 1992, vol. 35, No. 1, pp. 153–159.

Burke, J. J., et al., "A Thermal Stress Index for Cotton", *Agronomy Journal*, 1990, vol. 82, No. 3, pp. 526–530.

Wanjura, D. F., et al., "Evaluating Decision Criteria for Irrigation Scheduling of Cotton", *Transactions of the ASAE*, published by American Society of Agricultural Engineers, 1990, vol. 33, No. 2, pp. 512–518.

Burke, John J., et al., "Optimal Thermal Environments for Plant Metabolic Processes (*Cucumis sativus L*)", *Plant Physiol.*, 1993, 102, pp. 295–302.

Ferguson, David L., et al., "Influence of Water and Temperature Stress On the Temperature of Dependence of the Reappearance of Variable Fluorescence Following Illumination", *Plant Physiol*, 1991, 97, pp. 188–192.

(List continued on next page.)

*Primary Examiner*—Donald E. McElheny, Jr.
*Attorney, Agent, or Firm*—M. Howard Silverstein; Randall E. Deck; John D. Fado

[57] ABSTRACT

A process and device for managing irrigation of plants or crops using crop canopy temperate measurements by use of a specific time threshold. In this process, the canopy temperature of the target plant is repeatedly measured with an infrared thermometer. After each measurement, the canopy temperature is compared with a predetermined threshold canopy temperature, above which temperature the plant is thermally stressed. If the measured canopy temperature is less than or equal to the threshold canopy temperature, or if the existing humidity is restrictive to plant cooling, then irrigation is not indicated and the canopy temperature measurement is repeated at its designated time. However, if both the measured canopy temperature is greater than the threshold temperature, and the humidity is not restrictive to plant cooling, then an increment of time is added to a time register. The accumulated time in the time register is then compared to the time threshold, a predetermined constant defined as about the mean of the length of time per day that the canopy temperature for the plant, in a well-watered and non-stressed condition, exceeded the threshold canopy temperature in the target geographical area. As long as the accumulated time is substantially less than the time threshold, irrigation is either unnecessary or ineffective to achieve transpirational cooling, and the process is again repeated with measurement of the canopy temperature. However, once the accumulated time exceeds or is approximately equal to the time threshold, transpirational cooling is indicated and an irrigation signal is generated.

12 Claims, 4 Drawing Sheets

OTHER PUBLICATIONS

Peeler, Thomas C., et al., "The Influence of Dark Adaptation Temperature on the Reappearance of Variable Fluorescence Following Illumination", *Plant Physiol,* 1988, 86, pp. 0152–1504.

Burke, John J., "Variation Among Species in the Temperature Dependence of the Reappearance of Variable Fluorescence Following Illumination", *Plant Physiol.,* 1990, 93, pp. 652–656.

Wanjura, D. F., et al., Cotton Irrigation Using the "Thermal Kinetic Window Criteria", 1988 Proceedings of the Beltwide Cotton Production Conference.

Burke, J. J., et al., "Crop–Specific Thermal Kinetc Windows in Relation to Wheat and Cotton Biomass Production", *Agronomy Journal,* vol. 80, Jul.–Aug. 1988, No. 4, pp. 553–556.

Burke, John J., et al., "Leaf Temperature and Transpirational Control in Cotton", *Environmental and Experimental Botany,* 1989, vol. 29, No. 4, pp. 487–492.

BIOLOGICALLY-IDENTIFIED OPTIMAL TEMPERATURE INTERACTIVE CONSOLE (BIOTIC) FOR MANAGING IRRIGATION

BACKGROUND OF THE INVENTION

1. Field of the Invention

The invention relates to a method and apparatus for managing irrigation of plants. Irrigation management is based upon the optimum temperate for plant metabolism and an integration of the environment derived from the plant's canopy temperature.

2. Description of the Prior Art

The most common purpose of irrigation is to alleviate crop water stress by the timely application of supplemental water. Current irrigation scheduling methods frequently involve the measurement of soil moisture, atmospheric parameters, and other plant measurements such as canopy temperature, stomatal resistance, leaf color, and leaf water potential. This information is then used with simple decision rules or in more complex decision algorithms that calculate soil water balance, evapotranspiration, or a plant water stress index, in order to estimate the timing and quantity of irrigation application. The procedures require either a considerable effort in time and labor to directly measure soil or plant water status, or the measurement of numerous parameters for use as input to decision-making software for irrigation scheduling. Examples of some of these irrigation scheduling techniques are described by Hearne and Constable (1984, Irrig. Sci., 5:75–94), Villalobos and Fereres (1989, Trans. ASAE, 32(1):181–188), Pleban and Israeli (1989, J. Irrig. and Drainage Engr., 115:557–587), and Rogers and Elliott (1989, Trans ASAE, 32 (5): 1669–1677).

A common theme in the above procedures is that a crop's need for water is assessed indirectly. The development of infrared thermometers has made it possible to measure plant canopy temperature directly. Theoretical and empirical work by Jackson et al. (1981, Water Resour. Res., 17:1133) and Idso et al. (1981, Agric. Meteorol., 24:45), respectively, the contents of each of which are incorporated by reference herein, provide a method for calculating a crop water stress index (CWSI). The CWSI includes a direct measurement of canopy temperature in addition to other environmental parameters. The theoretical definition of CWSI evolves from a description of the energy balance for a plant canopy under non-water stressed conditions. CWSI is a normalized value where 0 and 1 represent completely non-stressed and completely stressed conditions, respectively.

The empirical method of measuring CWSI has been used by Garrot et al. (1990, Irrigation Scheduling Using the Crop Water Stress Index, In: Visions of the Future, Proceedings of the Third National Irrigation Symposium, St. Joseph, MI:A-SAE, p. 281–286) to schedule irrigation of cotton, wheat, pecans, and watermellons in Arizona. In these studies, irrigating when CWSI values were between 0.1 and 0.2 produced maximum yields.

Gardner et al. (U.S. Pat. No. 4,876,647, issued Oct. 24, 1989) developed a process and device for determining the the CWSI plants from measurements of air temperature, canopy temperature, relative humidity, and the relative intensity of sunlight.

Recently, the concept of thermal stress in plants has been investigated as a criterion for irrigation management. Mahan et al. (1987, Plant Physiol. Suppl., 83:87) and Burke et al. (1988, Agron. J., 80:553–556) disclosed that optimal enzyme function of a plant is restricted to a range of temperatures, referred to as the thermal kinetic window (TKW). Burke et al. also found that above ground biomass production was positively correlated to the cumulative time that the canopy temperature was within the TKW. Mahan and Upchurch (1988, Envirn. and Exp. Botany, 28:351–357) proposed that plants preferentially maintain a specific temperature, referred to as the normative plant temperature, $T_n$, in response to this narrow temperature range for optimal enzyme function. Three limitations to this homeothermic behavior were suggested: 1) sufficient energy input to raise the temperature to $T_n$, 2) sufficient water for transpirational cooling to $T_n$, and 3) humidity conditions which would allow for transpirational cooling to $T_n$.

Based on the existence of this normative plant temperature, $T_n$, and the observed relationship between plant temperate and plant performance, Wanjura et al. (1988, Proceed Beltwide Cotton Production Res. Confs; 183–185) disclosed the use of a threshold canopy temperature to control irrigation of cotton. In subsequent studies, Upchurch et al. (1990, Acta Horticulturae, 278:299–308), Wanjura et al. (1990, Trans. ASAE, 33(2):512–518) and Wanjura et al. (1992, Trans. ASAE, 35 (1):153–159), the contents of each of which are incorporated by reference herein, studied the automatic control of irrigation using continuous canopy temperature measurements. In accordance with these processes, cotton was irrigated whenever the average canopy temperature (measured over a predetermined time period) exceeded a predetermined threshold temperature.

SUMMARY OF THE INVENTION

We have now invented a novel process and device for managing irrigation of plants or crops using crop canopy temperature measurements. In contrast to prior processes relying upon determination of an averaged canopy temperature, we have discovered that improved irrigation control may be achieved by use of a specific time threshold. In this process, the canopy temperature of the target plant is repeatedly measured at a regular time interval, $t_i$, with an infrared thermometer. After each measurement, the canopy temperature is compared with a predetermined threshold canopy temperature, defined as approximately that canopy temperature which optimizes plant metabolism. At canopy temperatures above this threshold the plant is thermally stressed. The atmospheric humidity in the vicinity of the plant is also measured to determine if conditions would allow for transpirational cooling or if the humidity is sufficiently high as to restrict cooling. If the measured canopy temperature is less than or equal to the threshold canopy temperature, or if the humidity is restrictive to plant cooling, then irrigation is not indicated and the canopy temperature measurement is repeated at its designated time. However, if both the measured canopy temperature is greater than the threshold temperature, and the humidity is not restrictive to plant cooling, then an increment of time equal to $t_i$ is added to a time register to provide an accumulated time. The accumulated time in the time register is then compared to the time threshold, a predetermined constant defined as about the mean of the length of time per day that the canopy temperature for the plant, in a well-watered and non-stressed condition, exceeded the threshold canopy temperature in the target geographical area. As long as the accumulated time is substantially less than the time threshold, irrigation is either unnecessary or ineffective to achieve transpirational cooling, and the process is again repeated with measurement of the canopy temperature. However, once the accumulated time exceeds or is approximately equal to the time threshold, transpirational cooling is indicated and an irrigation signal is generated. After conclusion of irrigation, management may be resumed by resetting the time register to zero and repeating the process.

The invention also relates to an apparatus for automatically managing irrigation using the above-described process. The apparatus includes sensors for measuring the target plant's canopy temperature, the atmospheric humidity and, optionally, air nature. The apparatus also includes a microprocessor means having a first means for comparing the measured canopy temperate to a setpoint temperature, and for comparing the measured humidity to a setpoint or limiting humidity. A time register is operatively connected to this first means, and is effective for accumulating increments of time in response thereto. A second means for comparing is also operatively connected to the time register for comparing the accumulated time to a setpoint time. Display of an irrigation signal when the accumulated time is greater than said setpoint time, may be effected by signal generator operatively connected to the second means for comparing.

In accordance with this discovery, it is an object of this invention to provide an improved method and apparatus for managing irrigation of plants.

Another object of the invention is to provide a method and apparatus for managing irrigation of plants to minimize or alleviate plant temperature stress and hence maximize crop production and/or maximize water use efficiency.

Yet another object of the invention is to provide a method and apparatus for managing irrigation of plants based upon the biology of the plant and site specific integrated environmental conditions.

Other objects and advantages of the invention will become apparent from the ensuing description.

DETAILED DESCRIPTION OF THE INVENTION

Figure 1:
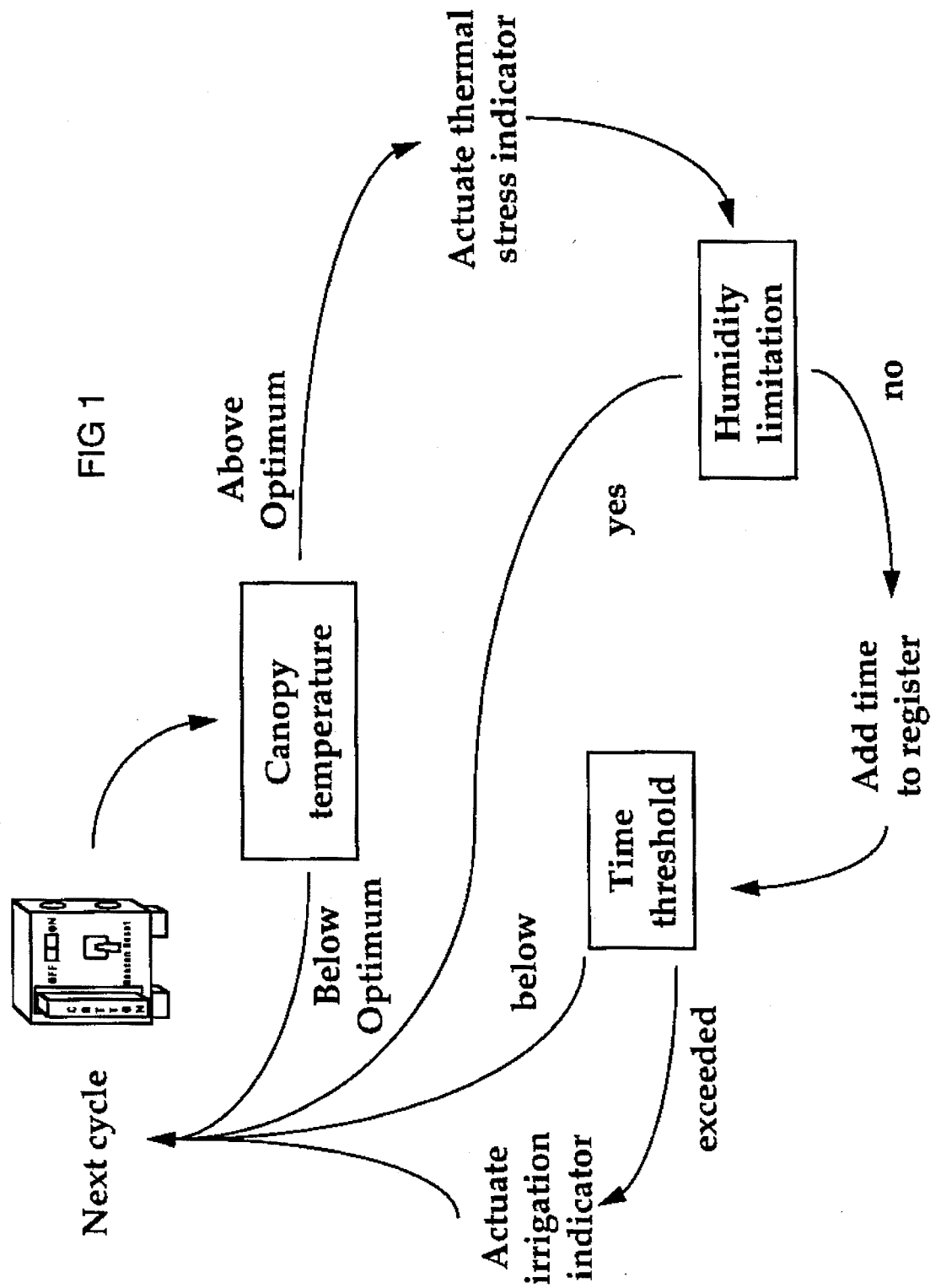
FIG. 1 is a flow diagram of the disclosed process for managing irrigation.

The process and apparatus of this invention may be used for managing irrigation or watering of a variety of plants, particularly agronomically important field crops, vegetables, fruits and fruit trees, turf grass, golf courses, urban landscapes and horticultural crops. Without being limited thereto, examples of plants which may be managed using this invention include cotton, corn, wheat, beans, soybeans, peppers, cucumbers, tomatoes, potatoes, peach trees, orange trees, pecan trees, roses and petunias. It is also envisioned that the invention may be used in any climate, with any production system or any type of irrigation system. In addition to its application in arid and semi-arid regions, the invention may be used in non-arid or humid regions to identify the need for supplemental irrigation, or even for managing watering in greenhouses. Irrigation systems of particular interest which may be used with this invention include, but are not limited to, drip, sprinkler, LEPA [low energy precision application, as described by Lyle and Bordovsky (1981, Trans ASAE, 24:1241–1245), and Bordovsky and Lyle (1988, ASAE Paper no. 88–2097, ASAE, St. Joseph, Mich.), the contents of each of which are incorporated by reference herein], and flood irrigation.

Determination of a plants need for water in accordance with this invention is based upon a biological canopy temperature threshold and an environment specific time threshold. The threshold canopy temperature is defined herein as approximately that canopy temperature which is effective for optimal plant metabolism. A variety of techniques may be used to predetermine the optimal metabolic temperature for a plant of interest, and hence the threshold canopy temperature for use herein. Without being limited thereto, suitable techniques include the temperature dependence of the reappearance of photosystem II variable fluorescence, evaluation of the temperature dependence of enzyme kinetics, and the temperate optimum for the synthesis of chlorophyll a/b light harvesting complex. The particular method selected is not critical.

In a preferred embodiment, the threshold canopy temperature is determined from analysis of the temperatures providing maximal photosystem II fluorescence reappearance following illumination, as described by Burke (1990, Plant Physiol., 93:652–656) and Ferguson and Burke (1991, Plant Physiol., 97:188–192), the contents of each of which are incorporated by reference herein. The technique monitors the time course of the reappearance of the variable flourescence signal (Fv) for leaves moved from the light and incubated in the dark at different temperatures. The rate of Fv reappearance and the maximal Fv value reached is dependent on the temperature of the leaf during the dark incubation period. That incubation temperature resulting in optimal Fv reappearance may be determined by comparing the maximum Fv values and the rate of fluorescence reappearance. Chlorophyll fluorescence reappearance measurements may be made according to the procedure described by Peeler and Naylor (1988, Plant Physiol., 86:152–154), the contents of which are incorporated by reference herein. In review, leaf segments from plants of interest are excised and illuminated for about 1 to 30 minutes, generally under the light conditions in which the plants were grown, at about 25° C. Following illumination, the leaf segments are transferred to temperature controlled blocks preset to temperatures ranging from about 10° to 45° C. and maintained in the dark. The induced chlorophyll fluorescence for leaf segments at each incubation temperature may be measured at regular time intervals (e.g., about 1 to 5 min) following illumination, using a suitable fluorometer. Results are expressed as the ratio of Fv (the peak Fmax of fluorescent light emission from the leaf during irradiation at the exciting irradiance minus the initial fluorescence) to Fo (the initial fluorescence). The optimum plant temperature for the recovery of photosystem II fluorescence, and thus the threshold canopy temperature, is that temperature producing the maximum Fv/Fo ratio, and in the minimum time in darkness required to reach the maximum Fv/Fo ratio.

Alternatively, the threshold canopy temperature may be determined from evaluation of the temperature dependence of enzyme kinetics or thermal kinetic window (TKW) of a target plant, defined as the temperature range for which the apparent Michaelis constant of enzymes remains within about 200% of the minimun observed value. The threshold canopy temperature may be selected from any value within this window, although the midpoint temperature in the TKW range is preferred. Determination of TKWs is described, for example, in Burke et al. (1990, Agronomy J., 82:526–530), Mahan et al. (1987, Plant Physiol. Suppl., 83:87), Burke et al. (1988, Agron. J., 80:553–556), and Mahan and Upchurch (1988, Envirn. and Exp. Botany, 28:351–357), the contents of each of which are incorporated by reference herein.

A comparison of threshold canopy temperatures for selected plants obtained from photosystem II fluorescence reappearance and the plants' TKW is shown in Table 1.

Still another method for determining the threshold canopy temperate is the measurement of the temperature optimum for the synthesis of chlorophyll a/b light harvesting complex of photosystem II (I/4CP II) in the target plant as described by Burke and Oliver (1993, Plant Physiol., 102:295–302), the contents of which are incorporated by reference herein.

Development of plant canopy temperatures in excess of the threshold canopy temperature serves as an indicator of thermal stress, and hence the need for application of irrigation water to achieve transpirational cooling. However, plant canopy temperatures are affected not only by air temperature, but by other environmental factors as well, including the atmospheric humidity. If the relative atmospheric humidity is sufficiently high, transpirational cooling of the plant may be restricted. Applying water under these restrictive conditions will not effectively lower the canopy temperature. In general, for an evaporative surface, the wet bulb temperate provides a measure of the absolute lower temperature limit to which the surface may be cooled. This wet bulb temperature, which may be readily measured with a psychrometer or wet bulb thermometer, is a function of the ambient relative humidity and air temperature. However, because of the geometry of plant leaves, it is impossible for them to cool by evaporation to the wet bulb temperature. At any existing conditions of air temperature and relative humidity, the potential of a non-stressed plant canopy temperature to approach the wet bulb temperature is controlled by wind speed, canopy structure and ambient radiation. We have discovered that a plant canopy is likely to only cool to about 1° to 5° C., usually to approximately 2° C., above the ambient wet bulb temperature. Therefore, the setpoint or limiting humidity for use in this invention has been defined as the value that is equivalent to a wet bulb temperature that is about 1° to 5° C. (preferably approximately 2° C.) below the predetermined threshold canopy temperature for the plant of interest. It is understood that the value of the limiting humidity may be expressed simply as this wet bulb temperature, or as the dew point temperature, or as the relative or absolute humidity, at a specified air temperature, which correspond to this wet bulb temperature.

In practicing the invention, humidity may be measured using any variety of techniques conventional in the art, including direct measurements with a mechanical or electric hygrometer, or by measurement of the wet bulb temperature or dew point, as described by Wexler (Humidity and Moisture: Measurement and Control in Science and Industry, vol. 1, Reinhold Publishing, New York, 1965).

In a preferred embodiment, humidity measurements are made by means of a conventional hygrometer. In this process, values of the limiting relative humidity at a range of air temperatures and at various threshold temperatures may be predetermined using standard psychrometric relationships. Generally, once the threshold canopy temperature for the plant of interest has been selected, a threshold wet bulb temperature may be designated as the threshold canopy temperate minus between about 1° to 5° C. (usually 2° C.). Using psychrometric relationships or charts, the relative humidity which corresponds to this threshold wet bulb temperature may be determined over a range of air temperatures; these humidity values represent the limiting humidity at each respective air temperature. During use, if the measured relative humidity is greater than or substantially equal to the predetermined limiting humidity at the given threshold canopy temperature and current air temperature, then the humidity is restrictive to cooling. Descriptions of psychrometric relationships and charts which may be used herein are described, for example, in Brooker (1967, Mathematical Model of the Psychrometric chart, Trans. of the ASAE, 1967:558–563), Goff (1949, Trans. ASHVE J. Section, Heating, Piping, Air Conditioning, 55,118), Payne et al. (1972, Modeling of the Psychrometric Chart, Univ. of Kentucky Agric. Engin. Tech. Series, 1972 No. 4:1–14), Wilhelm (1976, Numerical Calculation of Psychrometric Properties in SI Units, Trans. of the ASAE, 1976:318–325), or Bagnoli ecal. (Psychrometry, Evaporative Cooling, Air Conditioning, and Refrigeration, IN: Chemical Engineers Handbook, fifth ed., Perry and Chilton (Ed.), McGraw-Hill, New York, (1973) pp. 12-1 to 12-12), the contents of each of which are incorporated by reference herein.

In an alternative preferred embodiment, rather than measuring both air temperature and relative humidity, the ambient wet bulb temperature may be measured directly with a conventional wet bulb thermometer or psychrometer, as described by Wanjura et al. (1990, Trans. of the ASAE, 33:512–518), the contents of which are incorporated by reference herein. If the measured wet bulb temperate is less than or approximately equal to the above-mentioned threshold wet bulb temperate then the humidity is not restrictive to plant transpirational cooling. Conversely, if the measured wet bulb temperate is greater than the threshold wet bulb temperate, the relative humidity is sufficiently high as to restrict plant cooling.

Irrigation control in accordance with this invention is based on an integrated rather than a point in time measurement of plant and environmental conditions. The need for irrigation is not indicated until the accumulated length of time that a plant of interest has been thermally stressed exceeds a predetermined minimum time, referred to as a time threshold. The time threshold is a predetermined constant defined as about the mean length of time per day that the canopy temperature for the plant, in a well-watered and non-stressed condition, exceeded the threshold canopy temperature in the target geographical area. In other words, the time threshold refers to the length of time per day that the canopy temperature for a well watered plant would be expected to exceed the threshold canopy temperature, during a growing season in the geographical area of interest. We have discovered that the value of the time threshold is very stable within a given geographical area, and is only dependent upon that area and, to the extent that their threshold canopy temperatures vary, the plant of interest.

The time threshold may be determined empirically or from historical data of crop canopy temperatures. Methods for determining the time threshold include:

(a) field testing of multiple time thresholds for watering and the selection of the time which optimized crop performance or yield, (b) analysis of historical crop canopy temperatures for a crop grown under well-watered conditions, and (c) determination of well-watered crop canopy temperatures using an energy balance description for a plant or crop.

Of these methods, the former is least preferred because, although reliable, it is costly and time consuming. Analyzing historical crop canopy temperature is an accurate and direct procedure for determining time thresholds, but its use is limited by the availability of data. When data from the geographical area of interest is available, the crop canopy temperatures are analyzed to calculate the amount of time that a well watered plant is above its threshold temperature. Considering these limitations, determination of time thresholds from an energy balance of the plant is generally preferred because the theory for describing the energy environment is well established and the information needed to calculate well-watered canopy temperatures are available for many geographical areas. See Jackson et al. (1981, Water Resources Research, 17:1133–1138), the contents of which are incorporated by reference herein. In accordance with this method, by using an energy balance, the canopy temperature that occurs in a well-watered, non-stressed plant is calculated from the environmental data over an extended period, preferably the growing season, in the geographical area of interest. The time threshold is then the arithmetic mean of the length of time per day that the calculated well-watered canopy temperature exceeds the plant specific threshold canopy temperature described hereinabove.

In its general form, the energy balance of a plant may be expressed as follows:

$$R_n = G + H + \lambda E \tag{1}$$

where $R_n$ is the net radiation, G is the heat flux below the canopy, H is the sensible heat flux from the canopy, and $\lambda E$ is the latent heat flux to the air. Applying the fundamental equations describing G, H and $\lambda E$ and rearranging then the following equation can be obtained:

$$T_c - T_A = (r_a R_n / \rho c_p)(\gamma^* / \Delta + \gamma^*) - ((e_A^* - e_A)/(\Delta + \gamma^*)) \tag{2}$$

Where, $T_c$ = canopy temperature
$T_A$ = air temperature
$r_a$ = aerodynamic resistance
$R_n$ = net radiation
$\rho$ = density of air
$c_p$ = heat capacity of the air
$\Delta$ = slope of the saturation vapor pressure—temperature curve
$e_A^* - e_A$ = vapor pressure deficit of the air and
$\gamma$ = apparent psychrometric constant.

For a well watered plant transpiring at its potential rate $$\gamma^* = \gamma(1 + (r_{cp}/r_a)) \tag{3}$$

In this relationship, $r_{cp}$ is the resistance of a well watered plant.

Jackson et al. (ibid) defined the Crop Water Stress Index (CWSI) as:

$$\begin{aligned} CWSI &= 1 - E/E_p \\ &= (\gamma(1 + r_c/r_a) - \gamma^*)/(\Delta + \gamma(1 + r_c/r_a)) \end{aligned} \tag{4}$$

which ranges from 0 to 1, with a non-stressed plant having a value near zero. In this equation $r_c$ replaces $r_{cp}$ and represents the actual canopy resistance. The ratio $r_c/r_a$ can be defined by substituting equation 3 into equation 2 and rearranging to:

$$r_c/r_a = [\gamma r_a R_n/(\rho c_p - ((T_c - T_A)(\Delta + \gamma)) - (e_A^* - e_A))]/ [\gamma((T_c - T_A) - r_a R_n/\rho c_p)] \tag{5}$$

The well-watered canopy temperature is that value of $T_c$ that results in a CWSI that is close to zero. Since all parameters in equation 5 except $T_c$ are measured or can be derived, the well-watered canopy temperature is obtained by solving equation 5 iteratively. Generally, using an initial estimate for $T_c$, which for convenience may be $T_a$, the equation is solved, and the solution, $r_c/r_a$, applied to equation 4 to determine if the selected value of $T_c$ yields a CWSI between about 0 and 0.05. If not, the value of $T_c$ is modified and repeated. This analysis is further filtered to include in the analysis only time when the air temperature is greater than the threshold canopy temperature, net radiation is positive, and humidity is not limiting.

The remaining terms in equations 4 and 5 are well known and may be readily determined as described, for example, in Jackson et al., (ibid). Values for $r_{cp}$ can be obtained from available literature for many plants as described, for example, by O'Toole and Real (1986, Agronomy Journal, 78:305–310), Wanjura et al. (1984, Irrigation Science, 5:37–46) and Wanjura et al. (1990, Irrigation Science, 11:93–99). Procedures for estimating the aerodynamic resistance from wind speed and plant height measurements are also disclosed by Hatfield (1985, Agronomy Journal, 77:279–283) and Monteith (1973, Principles of Environmental Physics, American Elsevier Publishing, New York). The contents of each of these publications are incorporated by reference herein. When wind speed data is not available, $r_a$ may be set to a constant based on published data as in O'Toole and Real, or Wanjura et al.

Application of the energy balance for the determination of the well-watered canopy temperature and hence the time threshold may be summarized as follows:

1. Obtain environmental data for the geographical area of interest including: air temperature, net or global radiation, one of relative humidity, wet bulb temperature or dew point temperature, and optionally, wind speed. The data should be collected at relatively short time intervals, preferably every hour or less, and continuing over a period of time sufficient to represent the crop production cycle, usually approximately 2–3 months and preferably one growing season.

2. Obtain estimates of $r_{cp}$ from available literature or experimental observations for the plant of interest. If wind speed is unavailable, estimate $r_a$ from available literature or experimental observations.

3. Determine the canopy temperature that results in a CWSI near zero (between about about 0 and 0.05) for each time step of the environmental data when the air temperature is above the biological threshold, there is a net positive radiation ($R_n$), and humidity is not limiting to cooling.

4. For each day of available data determine the amount of time that the calculated canopy temperature is above the threshold canopy temperature for the plant of interest.

5. Calculate the time threshold as the arithmetic mean of daily values from 4.

The apparatus of the invention includes sensors for measuring the canopy temperature of a plant and the atmospheric humidity, communicating with a control unit for determining if the plant is thermally stressed and if irrigation is necessary. Measurements of canopy temperatures are made using a conventional infrared thermometer (IRT), sensitive to infrared radiation in the thermal range, between about 8 to 14 nm. Without being limited thereto, the IRT should have a fixed field of view, between about 15° and 45°, to provide a spot size that includes a portion of the canopies of several plants but does not extend above the horizon when mounted 1 m above the surface, and should allow correction for ambient temperate conditions. Suitable infrared thermometers are described, for example, by Wood and Scharf (U.S. Pat. No. 4,998,826) the contents of which are incorporated by reference herein. As mentioned hereinabove, humidity may be measured using a variety of conventional sensors including, but not limited to, mechanical or electric hygrometers, or wet bulb thermometers or psychrometers. An optional air temperature sensor or thermometer may also be included such as when measuring humidity with other than a wet bulb temperature sensor. In a preferred embodiment, the relative humidity may be measured with a polymer based capacitive sensor having integral temperature correction, and the air temperature may be measured with an RID, thermistor or thermocouple, shielded from direct radiation and mounted to allow ventilation or having a ventilation fan.

A microprocessor based computer control unit having conventional interface hardware is provided for receiving and interpreting the signals from the sensors. The microprocessor includes first hardware or software means for comparing the measured canopy temperature to a setpoint temperature, i.e. the threshold canopy temperature, to determine if the plant is thermally stressed. The microprocessor is also capable of determining if the humidity is sufficiently high to limit transpirational cooling. This determination may only require a simple comparison if the limiting humidity has been inputted, or may also include an algorithm for calculating the limiting relative humidity as described hereinabove. A time storage register is also provided which is in communication with the above-mentioned microprocessor components, which is effective for accumulating and storing increments of time in response to a positive indication of thermal stress without humidity limitations to cooling. Suitable time storage registers include but are not limited to electronic or microprocessor memory. Second means for comparing are provided in communication with the time storage register for comparing the accumulated time with a setpoint time, i.e. the time threshold. At least one signal generator may be provided in communication with this second means for comparing, which is effective for generating and displaying an irrigation signal when the accumulated time has exceeded the setpoint time. Signals may include audible alarms, visible beacons, lights or LEDS, printouts or any combination thereof. A second, optional signal generator may be provided in communication with the first means for comparing for generating and displaying a signal whenever the plant is thermally stressed.

Power for the apparatus may be provided using any conventional means, including generators, batteries, and AC electrical connections. Batteries are the preferred power source, and may include an optional solar recharging system.

The apparatus may be constructed as specific for a particular plant of interest, having values for the threshold canopy temperature and time threshold, and all necessary software permanently installed into the microprocessor. However, in the preferred embodiment, the microprocessor may be constructed with input means such as a plant selector module or manually operated keyboard, for entering the values of the appropriate threshold canopy temperature and time threshold, and optionally, the limiting humidity, to increase flexibility and allow use with any plant in any geographical area. A plant selector module may also include software for calculating limiting humidity if not directly input, and optionally any software for operating the system. It is envisioned that a plurality of plant selector modules may be used, each specific for a particular plant and geographical area of interest. Signal reset means, such as a switch or circuit responsive to instructions through a keyboard, may also be provided to inactivate and reset the signal generators.

Although irrigation may be manually actuated by the producer in response to the above-mentioned signals, the apparatus may include optional control means for automatically actuating irrigation. Suitable control means should include appropriate electronic circuitry effective for actuating the particular irrigation device in response to the second means for comparing. In accordance with this embodiment, automatic control means may replace or be used in conjunction with the signal generator.

Irrigation or water management using the process of this invention may be implemented for any plant and geographical area for which the the threshold canopy temperate, limiting humidity and time threshold have been determined as described hereinabove. Operation of the device is summarized in the Flow diagram shown in FIG. 1. The IRT, which may operate continuously or periodically, will monitor the plant canopy temperature with measurements recorded at a regular time interval $t_i$. Generally, although the time interval is not critical, shorter intervals are preferred to provide a more accurate indication of thermal stress. Without being limited thereto, time intervals less than about 15 minutes are preferred, with a time interval of about 1 minute being particularly preferred. Upon each measurement, the canopy temperature is transmitted to the microprocessor where it is compared with the predetermined threshold canopy temperature to determine if the plant is thermally stressed. If the measured canopy temperature exceeds the threshold canopy temperature the plant is thermally stressed and a signal is produced by the second signal generator. The humidity sensors measure the atmospheric humidity in the vicinity of the plant over the same period, and the measurement is also transmitted to the microprocessor to determine if conditions would allow for transpirational cooling or if the humidity is sufficiently high as to restrict cooling. If the measured canopy temperature is less than or equal to the threshold canopy temperature, or if the humidity is restrictive to plant cooling, then irrigation is not indicated and the canopy temperature measurement is repeated at the next time interval. In the event that the measured canopy temperature is greater than the threshold temperature, and the humidity is not restrictive to plant cooling, then an increment of time equal to $t_i$ is added to the time register to provide an accumulated time. The accumulated time in the time register is then compared to the time threshold. If the accumulated time is substantially less than the time threshold, irrigation is either unnecessary or ineffective to achieve transpirational cooling, and the process is again repeated with measurement of the canopy temperature. However, once the accumulated time exceeds or is approximately equal to the time threshold, transpirational cooling is indicated and an irrigation signal is produced by the first signal generator, or in the event of automatic control, the irrigation device is actuated.

While not essential, it is preferred to automatically or manually reset the time register to zero at a predetermined time each day if no irrigation has been initiated. Following irrigation, the process of the invention may he repeated, by resetting the time register accumulating time, at any time following conclusion of watering. The first signal generator, which indicates the need for irrigation, should be manually reset, particularly when automatic control of the irrigation device is not employed. The second signal generator on the other hand may manually reset, or preferably automatically reset whenever the canopy temperature drops below the threshold canopy temperature.

The following examples are intended only to further illustrate the invention and are not intended to limit the scope of the invention which is defined by the claims.

EXAMPLE 1

The canopy temperature threshold of the sunflower was determined from analysis of the temperatures providing maximal photosystem II fluorescence reappearance following illumination. Leaves from sunflowers were obtained and 8 discs (>1 cm diameter) were excised therefrom, immediately placed on a sponge or filter paper pad moistened with water, and covered with GladWrap plastic film to prevent moisture loss.

Incubation of leaf samples was conducted on a Cellular Thermal Electric Centerller (CELTEC) warmed to 30° C. having moistened 3MM filter paper pads covering the temperature controlled blocks. Leaf discs were placed on the 3MM filter pads, covered with GladWrap and exposed to light (greater than 300 µE m-2s-1) from a 1000 W High Pressure Sodium Lamp for 10 minutes. Following the 10 minute exposure, with the light still on, the temperature of four of the CELTIC blocks was adjusted to 10° C., and the temperature of the other four blocks to 15° C. The light was turned off once the blocks reached the designated temperatures (approximately 1 minute).

Figure 2:
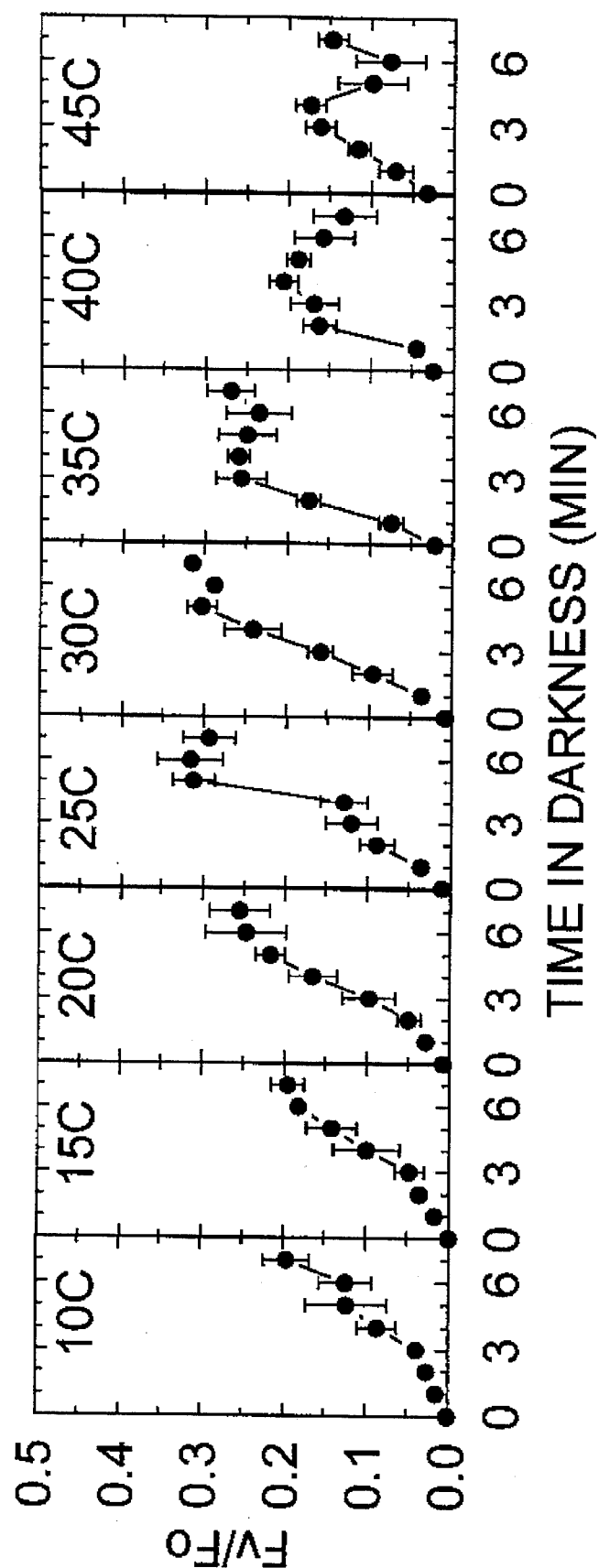
FIG. 2 shows data from an analysis of the maximal photosystem II fluorescence reappearance following illumination for the sunflower as described in Example 1.

Immediately after the light was turned off, initial fluorescence (Fo) and maximum fluorescence (Fmax) were measured with a fluorometer for the leaf discs on the first block of each of the 10° and 15° C. treatments. Measurements were made using a Branker SF30 Plant Productivity Meter with a measurement time of 10 seconds and a light intensity of 5 watts. At one minute after turning off the light, Fo and Fmax were obtained for the leaf discs on the second block of the 10° and 15° C. treatments. Measurements of Fo and Fmax were repeated at 1 minute intervals (i.e. minutes 2–7) for blocks 3,4 and then 1 to 4, respectively, of the 10° and 15° C. treatments. After the last measurement, leaf samples were discarded and the process was repeated using new leaf samples with treatment temperatures of 20° and 25° C., 30° and 35° C., and 40° and 45° C. Results were plotted as the ratio of Fv/Fo vs. time for each temperature and are shown in FIG. 2 (Fv=Fmax-Fo). The range between 20° and 35° C. provided the highest Fv/Fo ratios.

Figure 3:
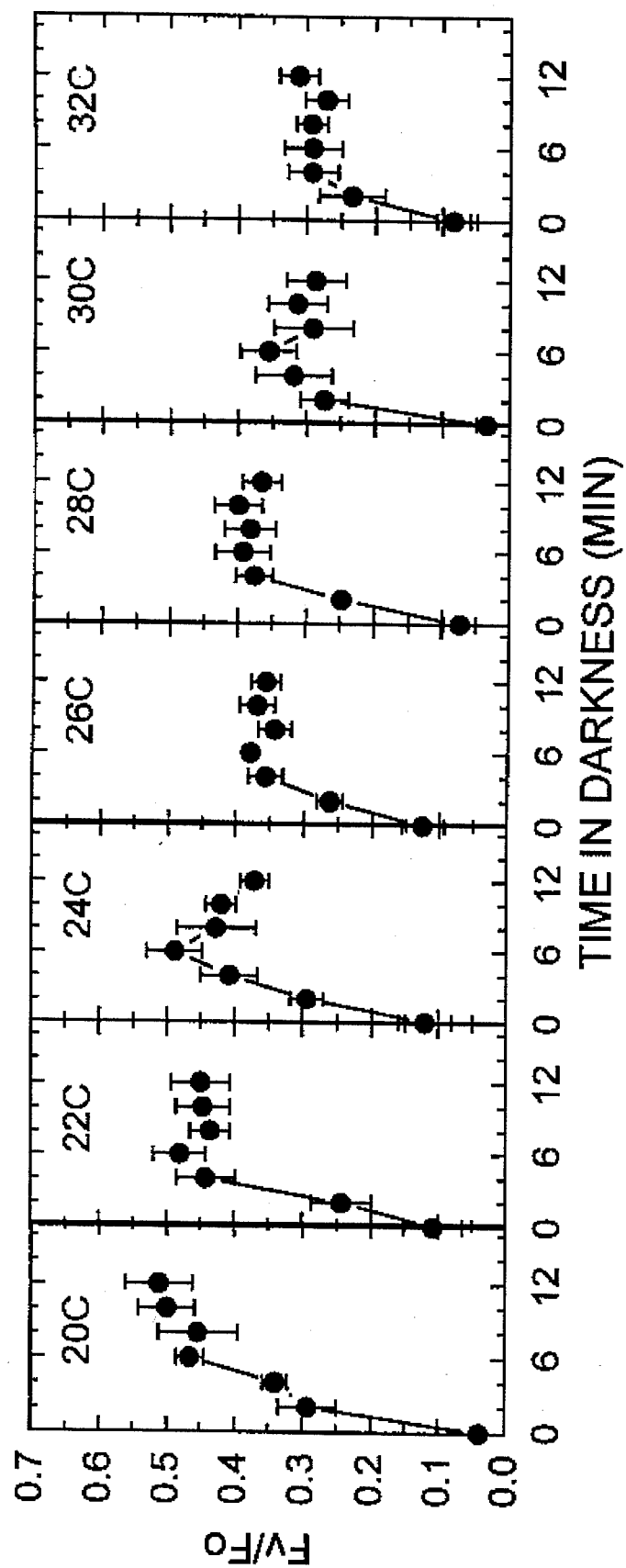
FIG. 3 shows additional data from an analysis of the maximal photosystem II fluorescence reappearance following illumination for the sunflower as described in Example 1.
Figure 4:
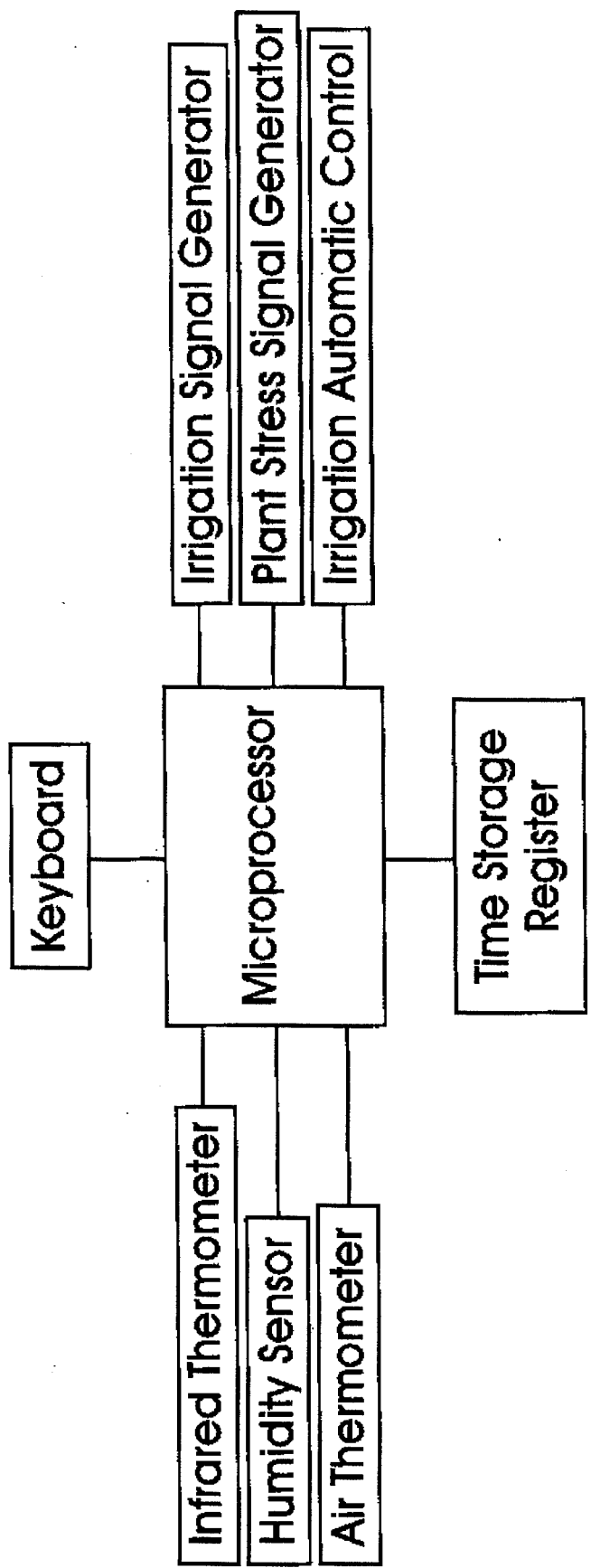
FIG. 4 shows the disclosed apparatus of managing irrigation. The components are as follows: infrared thermometer; humidity sensor; air thermometer; microprocessor; time storage register; first signal generator for generating and displaying an irrigation signal; second signal generator for generating and displaying a signal that the plant is stressed; keyboard; and irrigation automatic control device.

The process was repeated using new samples with 2° C. intervals from 20° to 32° C. and measurements made every two minutes over a twelve minute period. The results are shown in FIG. 3. The 22°–24° C. treatments attained the highest Fv/Fo ratio in the shortest time, and hence represent the threshold canopy temperate for the sunflower.

EXAMPLE 2

For investigative research purposes, the irrigation procedure was implemented using a Campbell Scientific 21X datalogger as the processor. An Exergen model IRF/c.2, type K, infrared thermometer was interfaced to the datalogger to measure the plant temperature. A Hy-Cal Engineering model CT-829-A-H19-X21 Monolithic IC relative humidity sensor was interfaced to the datalogger to measure relative humidity. Air temperature was measured using a Type K thermocouple interfaced to the datalogger. Two 12 volt lights were used as indicators for high temperature stress and for the irrigation signal. Standard internal software provided in the datalogger was used for conversion of the sensor signals to appropriate engineering units and to control operation of the indicator lights. All equipment was powered from a 12 volt deep cycle marine battery that was charged by a solar panel (Solec model S-25 panel and ACS 12/12E controller). Crop and environment specific information was provided through software to the processor which collected plant and air temperature and relative humidity, and accumulated time above the threshold temperature. The processor made comparisons between the observed plant temperature and the threshold temperature, observed relative humidity and the calculated limiting value, and accumulated time above the threshold temperature and the environment specific time threshold for irrigation. The processor actuated relays to turn on the indicator lights when the threshold temperature was exceeded and when sufficient time above the threshold had accumulated to indicate the need for irrigation.

It is understood that the foregoing detailed description is given merely by way of illustration and that modifications and variations may be made therein without departing from the spirit and scope of the invention.

TABLE 1

| Identified temperature optima for selected crops (°C.) | | |
|---|---|---|
| Species | Maximum Fluorescence Reappearance | Minimum Apparent Km |
| Bell peppers | 30–35 | 35 |
| Cotton | 30 | 27.5 |
| Cucumbers | 30–35 | 32.5 |
| Petunias | 25 | 25 |
| Potatoes | 20 | 20 |
| Soybean | 20–30 | 25 |
| Tomatoes | 20–25 | 22.5 |
| Wheat | 20 | 20 |

We claim:

1. A method for use in managing the irrigation of plants comprising:

a) measuring the canopy temperature of a target plant at a regular interval of time, $t_i$, using an infrared thermometer;

b) measuring the atmospheric humidity in the vicinity of said plant;

c) comparing said canopy temperature with a threshold canopy temperature, said threshold canopy temperature for said plant being approximately that canopy temperature which is effective for optimal plant metabolism, and determining if said humidity is restrictive to plant cooling;

1) returning to said step (a) if either: (i) the measured canopy temperature is less than or equal to said threshold canopy temperature, or (ii) said humidity is restrictive to plant cooling;

2) adding an increment of time equal to $t_i$ to a time register to provide an accumulated time if both the measured canopy temperature is greater than said threshold canopy temperature, and said humidity is not restrictive to plant cooling;

d) comparing the accumulated time in said time register to a time threshold, wherein said time threshold is determined as about the mean of the length of time per day that the canopy temperature for said plant in a well-watered and non-stressed condition exceeded said threshold canopy temperature;

1) if said accumulated value is greater than or approximately equal to said time threshold, then generating and displaying an irrigation signal, or automatically initiating irrigation, or both;

2) returning to said step (a), if said accumulated value is not greater than nor approximately equal to said time threshold.

2. The method as described in claim 1 wherein said target plant is selected from the group consisting of field crops, vegetables, fruits and fruit trees, turf grass, golf courses, urban landscapes and horticultural crops.

3. The method as described in claim 1 wherein said step of determining if the humidity is restrictive to plant cooling comprises comparing the measured humidity to a predetermined setpoint humidity.

4. The method as described in claim 1 wherein said step of determining if the humidity is restrictive to plant cooling comprises calculating the limiting relative humidity for said target plant, and comparing the measured humidity to said limiting relative humidity.

5. The method as described in claim 1 wherein said interval of time, is less than or equal to about 15 minutes.

6. The method as described in claim 1 wherein said interval of time, $t_i$, is about 1 minute.

7. An apparatus for use in managing the irrigation of plants comprising:

a) an infrared thermometer effective for measuring plant canopy temperature;

b) a sensing means effective for measuring atmospheric humidity;

c) a microprocessor effective for comparing the measured canopy temperature to a setpoint temperature, and for comparing the measured humidity to a limiting humidity value; and d) a time register operatively connected to said microprocessor effective for accumulating increments of time in response to said microprocessor wherein said microprocessor is also effective for comparing the accumulated time in said time register to a setpoint time.

8. The apparatus as described in claim 7 further comprising a signal generator operatively connected to said microprocessor, effective for displaying an irrigation signal when the accumulated time is greater than said setpoint time, wherein said irrigation signal is displayed by said signal generator for a operator to review and manual actuate irrigation.

9. The apparatus as described in claim 7 further comprising a signal generator operatively connected to said microprocessor, effective for displaying a signal when said measured canopy temperature is greater than said setpoint temperature.

10. The apparatus as described in claim 7 further comprising a sensing means effective for measuring air temperature.

11. An apparatus as described in claim 7 further comprising input means for designating said setpoint temperature and said setpoint time to said microprocessor.

12. The method as described in claim 1 wherein said irrigation signal is an audible or visible signal.

* * * * *